(12) United States Patent
Ng-Thow-Hing et al.

(10) Patent No.: US 9,431,027 B2
(45) Date of Patent: *Aug. 30, 2016

(54) SYNCHRONIZED GESTURE AND SPEECH PRODUCTION FOR HUMANOID ROBOTS USING RANDOM NUMBERS

(75) Inventors: Victor Ng-Thow-Hing, Sunnyvale, CA (US); Pengcheng Luo, Davis, CA (US)

(73) Assignee: Honda Motor Co., Ltd., Tokyo (JP)

(*) Notice: Subject to any disclaimer, the term of this patent is extended or adjusted under 35 U.S.C. 154(b) by 492 days.

This patent is subject to a terminal disclaimer.

(21) Appl. No.: 13/352,182

(22) Filed: Jan. 17, 2012

(65) Prior Publication Data

US 2012/0191460 A1    Jul. 26, 2012

Related U.S. Application Data

(60) Provisional application No. 61/436,546, filed on Jan. 26, 2011.

(51) Int. Cl.
    *G10L 21/00* (2013.01)
    *G10L 25/00* (2013.01)
    (Continued)

(52) U.S. Cl.
    CPC .............. *G10L 21/10* (2013.01); *G10L 13/043* (2013.01); *G10L 13/08* (2013.01); *G10L 15/265* (2013.01)

(58) Field of Classification Search
    CPC .... G10L 19/00; G10L 15/265; G10L 13/043
    USPC .......................................................... 704/275
    See application file for complete search history.

(56) References Cited

U.S. PATENT DOCUMENTS 7,515,992 B2    4/2009  Sawada et al.
7,720,572 B2    5/2010  Ziegler et al.
(Continued)

FOREIGN PATENT DOCUMENTS

JP    2001-188784 A    7/2001
JP    2003-044080 A    2/2003
(Continued)

OTHER PUBLICATIONS

Archive of "Robot Gesturing" Bristol Robotics Laboratory, 2005, 2006, 2007, 2008, 2009, 2010, Last Updated Aug. 28, 2009, [online] [Archived by http://archive.org on Sep. 12, 2010; Retrieved on Aug. 23, 2012] Retrieved from the Internet<URL:http://web.archive.org/web/20100912204629/http://www.brl.ac.uk/projects/gesture/index.html>.

(Continued)

Primary Examiner — Farzad Kazeminezhad
(74) Attorney, Agent, or Firm — Arent Fox LLP

(57) ABSTRACT

A system or method for generating gestures in a robot during generation of a speech output by the robot by analyzing a speech text and selecting appropriate gestures from a plurality of candidate gestures. The speech text is analyzed and tagged with information relevant to generating of the gestures. Based on the speech text, the tagged information and other relevant information, a gesture identifier is selected. A gesture template corresponding to the gesture identifier is retrieved and then processed by adding relevant parameter to generate a gesture descriptor representing a gesture to be taken by the robot. A gesture motion is planned based on the gesture descriptor and analysis of timing associated with the speech, wherein the amplitude, frequency or speed of the selected gesture is modified based on random numbers of specific range depending on the status of the robot. Actuator signals for controlling the actuators such as arms and hands are generated based on the planned gesture motion.

16 Claims, 6 Drawing Sheets

(51) Int. Cl.
G10L 19/00 (2013.01)
G10L 21/10 (2013.01)
G10L 13/04 (2013.01)
G10L 15/26 (2006.01)
G10L 13/08 (2013.01)

(56) References Cited

U.S. PATENT DOCUMENTS

| | | | |
|---|---|---|---|
| 7,738,997 | B2 | 6/2010 | Lin |
| 2001/0021909 | A1* | 9/2001 | Shimomura et al. ......... 704/275 |
| 2003/0023348 | A1* | 1/2003 | Inoue et al. ................. 700/245 |
| 2003/0152261 | A1 | 8/2003 | Hiroe et al. |
| 2004/0153211 | A1 | 8/2004 | Kamoto et al. |
| 2006/0184273 | A1 | 8/2006 | Sawada et al. |
| 2008/0071540 | A1 | 3/2008 | Nakano et al. |
| 2009/0149991 | A1 | 6/2009 | Sumida et al. |

FOREIGN PATENT DOCUMENTS

| | | |
|---|---|---|
| JP | 2003-205483 A | 7/2003 |
| JP | 2004-268235 A | 9/2004 |
| JP | 2004-309523 A | 11/2004 |
| JP | 2005-059186 A | 3/2005 |
| JP | 2008-122927 A | 5/2008 |
| JP | 2009-136967 A | 6/2009 |
| JP | 2009-222969 A | 10/2009 |
| JP | 2010-149276 A | 7/2010 |
| JP | 2010-149277 A | 7/2010 |

OTHER PUBLICATIONS

Brooks, A. G., "Working with Robots and Objects: Revisiting Deictic Reference for Achieving Spatial Common Ground," In Proceedings of Human-Robot Interaction, Mar. 2-4, 2006, pp. 297-304.
Bruce, A. et al., "The Role of Expressiveness and Attention in Human-Robot Interaction," AAAI Technical Report FS-01-02, 2001, 5 pages, Can be retrieved at <URL:http://citeseerx.ist.psu.edu/viewdoc/download?doi=10.1.1.57.6633&rep=rep1&type=pdf>.
Cassell, J. et al., "BEAT: the Behavior Expression Animation Toolkit," In SIGGRAPH 2001: Proceedings of ACM SIGGRAPH, New York, NY, USA, Aug. 12-17, 2001, ACM, pp. 477-486.
Chi, D. et al., "The EMOTE Model for Effort and Shape," In SIGGRAPH 2000: Proceedings of ACM SIGGRAPH, 2000, pp. 173-182.
Dillmann, R., "Teaching and Learning of Robot Tasks Via Observation of Human Performance," Robotics and Autonomous Systems, 2004, pp. 109-116, vol. 47, Can be retrieved at URL<http://citeseerx.ist.psu.edu/viewdoc/download?doi=10.1.1.99.6027&rep=rep1&type=pdf>.
Giuliani, M., "Representation of Speech and Gestures in Human-Robot Interaction" Proceedings of the International Conference on Multimodal Interfaces (ICMI 2008), Oct. 2008, 26 pages, Can be retrieved at<URL:http://www6.in.tum.de/~foster/roman2008/slides/giuliani.pdf>.
Hartmann, B. et al., "Implementing Expressive Gesture Synthesis for Embodied Conversational Agents," In Gesture in Human-Computer Interaction and Simulation, Springer, May 18-20, 2005, pp. 188-199, vol. 3881.
Honda Motor Co., Ltd. Asimo Year 2000 Model, 2003, Can be retrieved at<URL:http://world.honda.com/ASIMO/technology/spec.html>.
Itoh, K. et al., "Various Emotional Expressions with Emotion Expression Humanoid Robot WE-4RII," In IEEE Conference on Robotics and Automation 2004 TExCRA Technical Exhibition Based, 2004, pp. 35-36.
Kendon, A., Gesture: Visible Action as Utterance. Cambridge University Press, 2004, 52 pages.

Kochanek, D.H.U. et al., "Interpolating Splines with Local Tension, Continuity, and Bias Control," ACM SIGGRAPH Computer Graphics, Jul. 1984, pp. 33-41, vol. 18, No. 3.
Kopp, S. et al. "Synthesizing Multimodal Utterances for Conversational Agents," Computer Animation and Virtual Worlds, 2004, pp. 39-52, vol. 15, No. 1.
Levine, S. et al., "Gesture Controllers," ACM Transactions on Graphics, Jul. 2010, 14 pages, vol. 29, No. 4.
Levine, S. et al., "Real-Time Prosody-Driven Synthesis of Body Language," ACM Trans. Graph., Dec. 2009, pp. 1-10, vol. 28, No. 5.
Manning, C.D. et al., Foundations of Statistical Natural Language Processing. MIT Press, 1999, 41 pages.
McNeill, D. Gesture and Thought. University of Chicago Press, 2005, 14 pages.
Narahara, H. et al., "Factors of Gestures of Robots for Smooth Communication with Humans," In RoboComm '07: Proceedings of the 1st International Conference on Robot Communication and Coordination, 2007, pp. 1-4, Can be retrieved at<URL:http://wicat.sys.virginia.edu/RoboComm2007/pdf/paper2154.pdf.
Neff, M. et al., Gesture Modeling and Animation Based on a Probabilistic Re-Creation of Speaker Style, ACM Transactions on Graphics, Mar. 2008, pp. 1-24, vol. 27, No. 1, 5.
Ng-Thow-Hing, V. et al., "The Memory Game: Creating a Humanrobot Interactive Scenario for Asimo," In International Conference on Intelligent Robots and Systems (IROS 2008), IEEE, Sep. 22-26, 2008, pp. 779-786.
PCT International Search Report and Written Opinion, PCT Application No. PCT/US12/22258, May 10, 2012, 13 pages.
Robbel, P. et al., "An Integrated Approach to Emotional Speech and Gesture Synthesis in Humanoid Robots," AFFINE '09, ACM, Nov. 6, 2009, 4 pages, Can be retrieved at URL<http://web.media.mit.edu/~mehoque/Publications/Robbel-Hoque-Breazeal-Affine-2009.pdf>.
Rose, C. et al., "Verbs and Adverbs: Multidimensional Motion Interpolation Using Radial Basis Functions," IEEE Computer Graphics and Applications, 1998, pp. 32-40, vol. 18, No. 5.
Salem, M. et al., "Effects of Gesture on the Perception of Psychological Anthropomorphism: A Case Study with a Humanoid Robot," Third International Conference on Social Robotics, ICSR 2011, LNAI 7072, Nov. 24-25, 2011, pp. 31-41, Springer-Verlag.
Salem, M. et al., "Generating Robot Gesture Using a Virtual Agent Framework," the 2010 IEEE/RSJ International Conference on Intelligent Robots and Systems, Oct. 18-22, 2010, Taipei, Taiwan, pp. 3592-3597, Can be retrieved at<URL:http://www.techfak.uni-bielefeld.de/~msalem/pub/ IROS2010_SalemKoppWachsmuthJoublin.pdf>.
Salem, M. et al., "Towards Meaningful Robot Gesture," In Human Centered Robot Systems, 2009, pp. 173-182, vol. 6.
Shiratori, T. et al., "Synthesis of Dance Performance Based on Analyses of Human Motion and Music," IPSJ Online Transactions, 2008, pp. 80-93, vol. 1.
Stone, M. et al., "Speaking with Hands: Creating Animated Conversational Characters from Recordings of Human Performance," In SIGGRAPH '04: ACM SIGGRAPH 2004 Papers, ACM, New York, NY, USA, 2004, pp. 506-513.
Sugiura, H. et al., "Real-time Collision Avoidance with Whole Body Motion Control For Humanoid Robots," In Proceedings of the 2007 IEEE/RSJ International Conference on Intelligent Robots and Systems, Oct. 29-Nov. 2, 2007, pp. 2053-2058.
Sugiyama, O. et al., "Natural Deictic Communication with Humanoid Robots," Proceedings of the 2009 IEEE/RSJ International Conference on Intelligent Robots and Systems (IROS 2007), Oct. 29-Nov. 2, 2007, pp. 1441-1448.
Tepper, P. et al., "Content in Context: Generating Language and Iconic Gesture Without a Gestionary," In Proceedings of the Workshop on Balanced Perception and Action in ECAs at AAMAS '04, 2004, 8 pages.
Toutanova, K. et al., "Enriching the Knowledge Sources Used in a Maximum Entropy Part-of-Speech Tagger," In Proceedings of the Joint SIGDAT Conference on Emirical Methods in Natural Language Processing and Very Large Corpora (EMNLP/VLC-2000), 2000, pp. 63-70.

(56) References Cited

OTHER PUBLICATIONS

Wachsmuth, I. et al., "Lifelike Gesture Synthesis and Timing for Conversational Agents," In Gesture and Sign Language in Human Computer Interaction, Springer, 2002, pp. 225-235.

Wolf, J.C. et al., "Linking Speech and Gesture in Multimodal Instruction Systems" the 15$^{th}$ IEEE International Symposium on Robot and Human Interactive Communication (RO-MAN06), Hatfield, UK, Sep. 6-8, 2006, pp. 141-144, Can be retrieved at<URL:http://www.tech.plym.ac.uk/soc/staff/guidbugm/pub/roman-06_wolf_bugmann.pdf>.

Japanese Office Action mailed Dec. 25, 2015 for Japanese Patent Application No. 2013-551266, with complete English translation.

P. Bremner, A. Pipe, and C. Melhuish, "Conversational Gestures in Human-Robot Interaction," Proceedings of the 2009 IEEE International Conference Systems, Man, and Cybermetrics, San Antonio, Texas, p. 1645 (2009), 5 pages.

Z.M. Hanafiah, C. Yamazaki, A. Nakamura, and Y. Kuno, "Understanding Inexplicit Utterances Using Vision for Helper Robots," Proceedings of the 17th International Conference on Pattern Recognition, 4 pages.

* cited by examiner

SYNCHRONIZED GESTURE AND SPEECH PRODUCTION FOR HUMANOID ROBOTS USING RANDOM NUMBERS

CROSS-REFERENCE TO RELATED APPLICATIONS

This application claims priority under 35 U.S.C. §119(e) to U.S. Provisional Patent Application No. 61/436,546 entitled "Synthesized Gesture and Speech Production for Humanoid Robots," filed on Jan. 26, 2011, which is incorporated by reference herein in its entirety.

FIELD OF THE INVENTION

The present invention is related to producing gestures in a robot by analyzing a text of speech that is to be generated by the robot.

BACKGROUND OF THE INVENTION

Various modes may be used for human-robot interaction (HRI). One mode of HRI is the use of a computer user interface. An example of this mode is the use of a computer to upload commands or instructions to the robot. Such interactions are generally reserved for a user that is familiar with computer programming and has in-depth knowledge of a robot's operation. Another mode of operation is using speech synthesis and speech recognition. For general public lacking technical knowledge of robots, a natural way of interacting with the robots is by speaking to the robots and listening to any speech generated by the robots. Such mode of operations is intuitive on the part of humans but may require hardware devices and computer programs to process and synthesize speeches.

One way of enhancing interactions between humans and robots is to use gestures. A gesture is a form of non-verbal communication made by bodily actions. By itself or in conjunction with speech, gestures allow individuals to communicate with others effectively.

Gestures can be categorized into different types. One category of gestures is emblems. Emblems refer to self-contained gestures whose meaning can be understood without spoken words. Emblems include, for example, waving a hand to say goodbye or hello. Iconics are a category of gestures used in conjunction with words to indicate concrete things. Iconics include, for example, tracing out a trajectory of a path. Metaphorics are a group of gestures that provide imagery of the abstract. Metaphorics include a gesture referring to the sides of an argument by appearing to be holding invisible items in left and right hands. Deictics are gestures that utilize parts of the body to point out both concrete and abstract things during a conversation. Deictics include, for example, using an arm with the index finger extended at a target of interest. Beats are a group of gestures that are expressed in rhythmic hand motions in synchrony with the cadences of speech. More than one type of gestures may be expressed during a course of speech.

Humanoid robots have appearance and features similar to humans. Hence, many people feel a natural affinity for these robots. However, the humanoid robots often remain stationary during interactions with humans. Hence, users often feel interactions with the robots unnatural and awkward compared to human.

SUMMARY OF THE INVENTION

Embodiments relate to generating gestures in a robot by analyzing a speech text using different sets of rules to identify one or more candidate gestures for different types of gestures. A gesture may be selected from one or more candidate gestures for execution. Actuators in a robot may be controlled by generating actuator signals corresponding to the selected gesture.

In one embodiment, a voice output generated by synthesizing the speech text is synchronized with the gesture generated by the robot. The synchronization may be performed by adjusting the selected gesture or the synthesized voice.

In one embodiment, the speech text is tagged with information by analyzing the speech text. The one or more candidate gestures are identified by further analyzing the tagged information in addition to the speech text.

In one embodiment, the tagged information indicates types of words of the speech elements.

In one embodiment, an expressivity parameter is received to indicate a degree of expressivity to be expressed by the robot. A higher expressivity parameter may increase the chance of a gesture viewed as more expressive to be selected while a lower expressivity parameter may increase the change of a gesture viewed as less expressive to be selected. The gesture is selected based further on the expressivity parameter.

In one embodiment, at least one of amplitude, frequency and speed of the selected gesture is modified based on a random number. In this way, randomness may be introduced into the gesture, rendering gestures non-repetitive and making the gesture look more natural.

In one embodiment, the selected gesture is planned by adding a preparatory motion before making a motion corresponding to the selected gesture. The preparatory motion may move an effector from an end position of a prior gesture or a starting gesture to an initial position of the selected gesture.

In one embodiment, a plurality of pattern modules are used to detect matching of patterns in the speech text. The plurality of pattern modules include a first pattern module configured to apply a first set of rules to detect emblems, a second pattern module configured to apply a second set of rules to detect iconics, a third pattern module configured to apply a third set of rules to detect metaphorics, a fourth pattern module configured to apply a fourth set of rules to detect deictics, and a fifth pattern module configured to apply a fifth set of rules to detect beats. One or more of the pattern modules may apply grammar rules to the speech text.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

DETAILED DESCRIPTION OF THE DISCLOSURE

Figure 1:
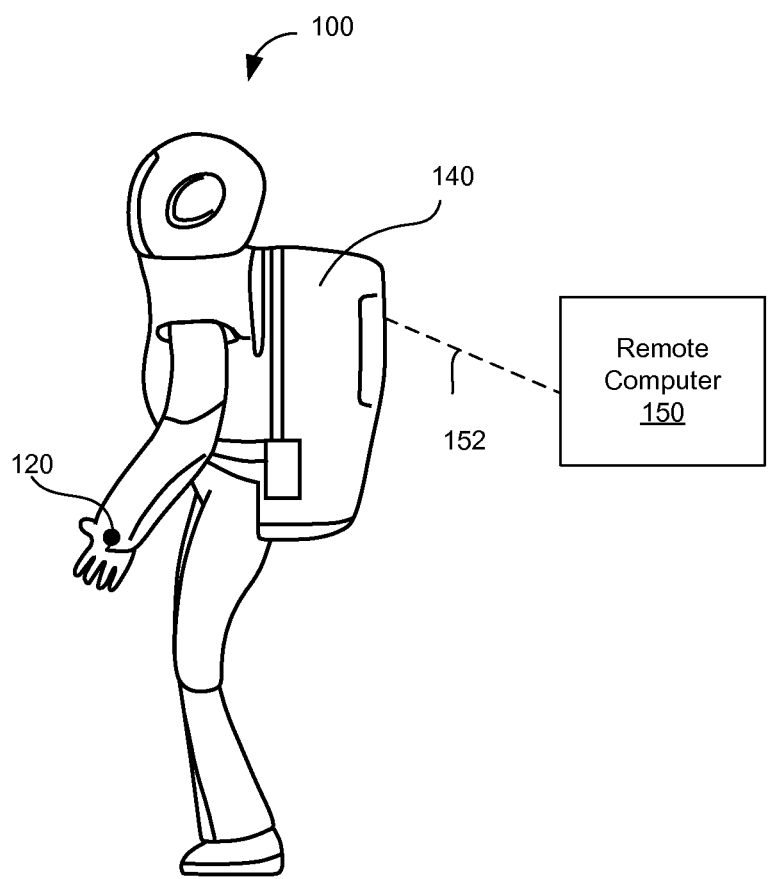
FIG. 1 is a schematic diagram of a robot and a remote computer communicating with the robot, according to one embodiment.

A preferred embodiment is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions could be embodied in software, firmware or hardware, and when embodied in software, could be downloaded to reside on and be operated from different platforms used by a variety of operating systems.

Embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure is intended to be illustrative, but not limiting, of the scope, which is set forth in the following claims.

Embodiments relate to generating gestures in a robot in synchrony with a speech output by the robot. The gestures are generated by analyzing a speech text and selecting an appropriate gesture for a time frame from a plurality of candidate gestures. The speech text is analyzed and tagged with information relevant to generating of the gestures. Based on the speech text, the tagged information and other relevant information, a gesture identifier is selected. A gesture template corresponding to the gesture identifier is retrieved and then processed by adding relevant parameter to generate a gesture descriptor representing a gesture to be taken by the robot. A gesture motion is planned based on the gesture descriptor and analysis of timing associated with the speech. Actuator signals for controlling the actuators such as arms and hands are generated based on the planned gesture motion.

As used herein, a "speech text" indicates a text of speech described in a natural language or a high-level language that can be converted to the natural language. The speech text may include a string of words.

As used herein, a "gesture identifier" refers to information that identifies a gesture from other gestures at a conceptual level. The gesture identifier may indicate, for example, "waving a hand," and "pointing to a target object."

As used herein, a "gesture template" refers to mapping of a gesture identifier to a trajectory of an effector (e.g., hand) in a robot. The trajectory may be dependent on one or more parameters associated with corresponding sensors or information processed from the sensors.

As used herein, a "gesture descriptor" represents an initial version of trajectory of an effector for expressing a gesture. The gesture descriptor is self-contained information that can be interpreted to generate a gesture without further information. The gesture descriptor may be further refined in a gesture planning stage to prepare a current gesture or blend the current gesture with a previous gesture.

As used herein, an "actuator signal" represents a machine level signal indicating coordinates, velocity and/or acceleration of an actuator (e.g., a motor) in a robot.

Overview of Robot Configuration

Figure (FIG. 1 is a schematic diagram of a robot 100 and a remote computer 150 communicating with the robot 100, according to one embodiment. The robot 100 may include, among other components, a plurality of body parts, actuators for causing relative movements between the body parts, a local computer 140, sensors and output devices (e.g., speaker). The plurality of body parts may include, for example, arms, hands, torso, head, legs and feet. The relative movements of these body parts are caused by actuators such as motors. The sensors may be attached to the body parts to sense the pose of the robot as well as to capture visual images or acoustic signals.

The local computer 140 is hardware, software, firmware or a combination thereof for processing sensor signals and other input commands, generating actuator signals, and communicating with other computing devices. In one embodiment, the local computer 140 communicates with a remote computer 150 via a channel 152 to perform distributed data processing or to load software or firmware from the remote computer. The channel 152 may be embodied using wired or wireless technology.

The body parts of the robot 100 may be moved relative to each other by actuators to generate gestures. In one embodiment, the gesture may be generated by defining a trajectory of an effector of the robot such as a hand 120. In other embodiments, trajectory of other effectors such as a foot or head of the robot 100 may also be defined to generate gestures.

Although FIG. 1 illustrates a humanoid form, embodiments may be used in robots of various other configurations to generate gestures using body parts available to the robots.

Figure 2:
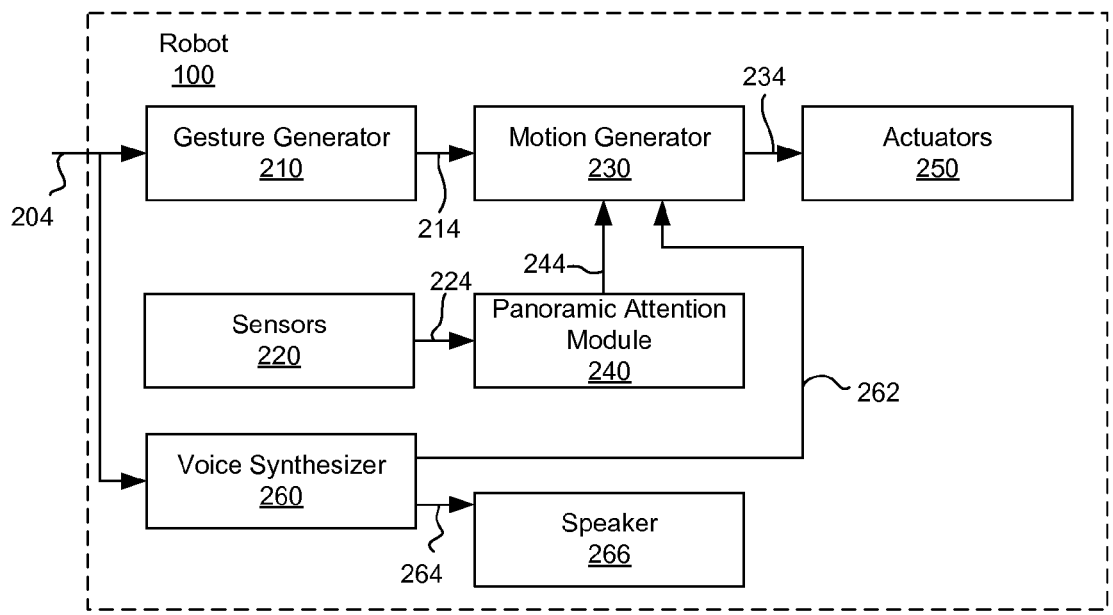
FIG. 2 is a block diagram of the robot, according to one embodiment.

FIG. 2 is a block diagram of the robot 100, according to one embodiment. The robot 100 may include, among other components, a gesture generator 210, a motion generator 230, actuators 250, sensors 220, a panoramic attention module 240, a voice synthesizer 260, and a speaker 266. The gesture generator 210, the motion generator 230, the panoramic attention module 240 and the voice synthesizer 260 may be embodied as software, firmware, hardware or a combination thereof. Further, the gesture generator 210, the motion generator 230, the panoramic attention module 240 and the voice synthesizer may be embodied by a single computing device.

The gesture generator 210 is hardware, software, firmware or a combination thereof for generating gesture descriptors 214 by analyzing and processing speech text 204. The speech text 204 may be generated by a computer program or received from a human operator. The gesture generate 210 is described below in detail with reference to FIGS. 3A and 3B.

In one embodiment, the speech text 204 is represented in the form of a natural human language. The speech text 204 may include meaningful words of phrases for communicating with human. Additional information may be added in the speech text 204 to indicate, for example, changes in the context of conversation, intonation or speed of the speech. In another embodiment, the speech text 204 is represented in a compressed format that abbreviates certain words or phrases to facilitate processing and communication of the speech text.

The gesture descriptors 214 include information on joint angles or the trajectory of effectors (e.g., hands 120). The gesture descriptors 214 are self-contained instructions that allow the motion generator 230 to plan and generate actuator signals 234 for controlling the actuators 250. In one embodiment, a single gesture descriptor 214 is active at a single time. However, the active gesture descriptor 214 may change during the course of the speech text and even during the course of a sentence.

The motion generator 230 receives the gesture descriptors 214 and processes the gesture descriptors 214 to generate the actuator signals 234. Each of the actuator signals 234 may be associated with a single actuator (e.g., a motor) to control its operation. The actuator signals 234 may define the coordinate of effectors, angles of joints in the robot 100 or velocity or acceleration of associated actuators 250. The motion generator 230 performs various functions associated with blending or stitching of gestures, controlling the expressivity and avoiding collision between body parts, as described below in detail with reference to FIG. 6.

The sensors 220 are hardware components for sensing various physical properties and converting these properties into electrical sensor signals 224. The sensor signals 224 may include perceptive sensor signals as well as pose sensor signals. The perceptive sensor signals allow the robot to recognize and process various objects or events surrounding the robot. The perceptive sensor signals may be generated, for example, by cameras or microphones. The pose sensor signals indicate the relative positions and/or movements of the body parts of the robot 100. The pose sensor signals enable detection of the actual pose of the robot 100.

The panoramic attention module 240 processes the sensor signals 224 to map the locations of events or objects surrounding the robot 100 into a panoramic coordinate system. By processing and identifying the locations of events or objects, the panoramic attention module 240 allows the robot 100 to perform gestures that are consistent with the locations or events or objects. For example, the panoramic attention module 240 enables the robot 100 to point to an object or person (i.e., entities) during the speech based on entity information 244. An example technique for embodying a panoramic attention module 240 is described, for example, in U.S. patent application Ser. No. 12/819,032, filed on Jun. 18, 2010, entitled "Panoramic Attention for Humanoid Robots," which is incorporated by reference herein in its entirety.

The voice synthesizer 260 synthesizes electronic signals 264 to generate speech on a speaker 266 or other audio output devices, using a method well known in the art. The voice synthesizer 260 also provides an output 262 to the motion generator 230 to allow the motion generator 230 to check the progress of speech and make any adjustments to the speed of the gestures so that the speech and the gestures can be synchronized.

One or more of the components illustrated in FIG. 2 may be embodied in the remote computer 150 to alleviate the volume of data to be processed at the local computer 140 or to simplify hardware components installed on the robot 100. In one embodiment, separate sensors may be connected to the remote computer 150 to provide additional information to the robot 100 concerning the environment surrounding the robot 100.

Example Gesture Generator

Figure 3A:
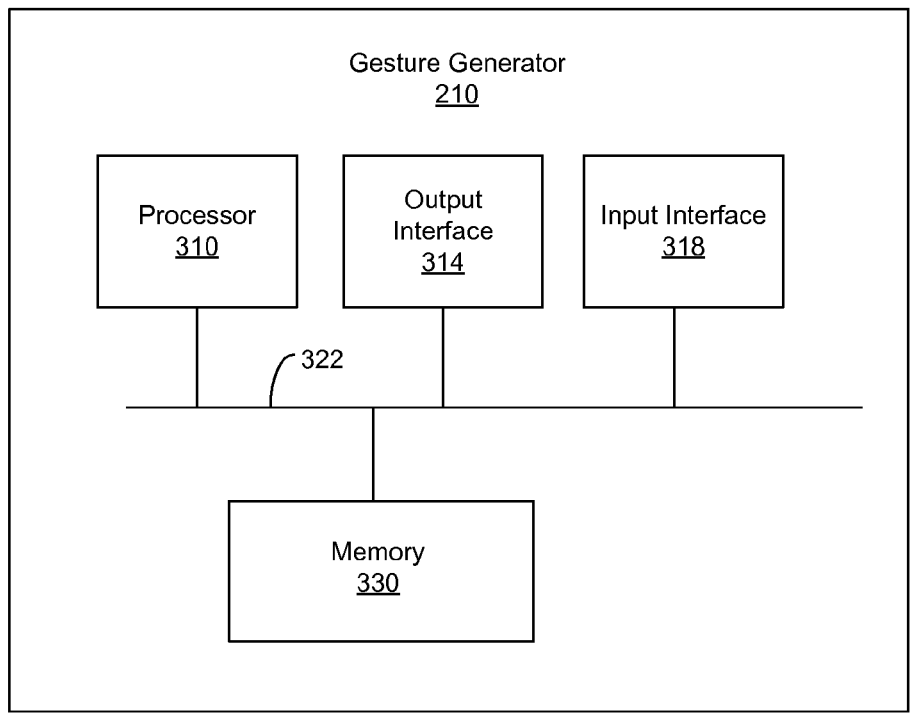
FIG. 3A is a block diagram of a gesture generator in the robot, according to one embodiment.

FIG. 3A is a block diagram of the gesture generator 210 in the robot 100, according to one embodiment. The gesture generator 210 receives the speech text 204 and generates the gesture descriptors 214 representing the gestures to be taken by the robot 100. The gesture generator 210 may include, among other components, a processor 310, an output interface 314, an input interface 318 and memory 330. These components are connected via a bus 322. As described above with reference to FIG. 2, the gesture generator 210 may be combined with other components of the robot 100 such as the motion generator 230, panoramic attention module 240 and the voice synthesizer 260.

The processor 310 is a hardware component that reads and executes instructions, and outputs processed data as a result of the execution of the instructions. The processor 310 may include more than one processing core to increase the capacity and speed of data processing.

The output interface 314 is a component that allows the gesture generator 210 to output data to other components of the robot 100. For example, the output interface 314 may send the gesture descriptors 214 to the motion generator 230 when the motion generator 230 is embodied on a computing device separate from the gesture generator 210. The output interface 314 may be embodied using various protocols including among others, IEEE 1394 and universal serial bus (USB).

The input interface 318 is a component that allows the gesture generator 210 to receive data from other components from the robot 100. For example, the input interface 318 may receive the speech text 204 from an external source. The input interface 318 may be embodied using various protocols including, among others, IEEE 1394 and USB. In one embodiment, the input interface 318 is combined with the output interface 314 to perform bi-directional communication with various components of the robot 100.

The memory 330 stores instruction modules and/or data for performing data processing operations at the processor 310. The details of instructions modules in the memory 330 are described below in detail with reference to FIG. 3B.

Although FIG. 3 illustrates the construction of the gesture generator 210, each of the motion generator 230, panoramic attention module 240 and the voice synthesizer 260 may include the same of similar components as the gesture generator 210 to perform their functions.

Figure 3B:
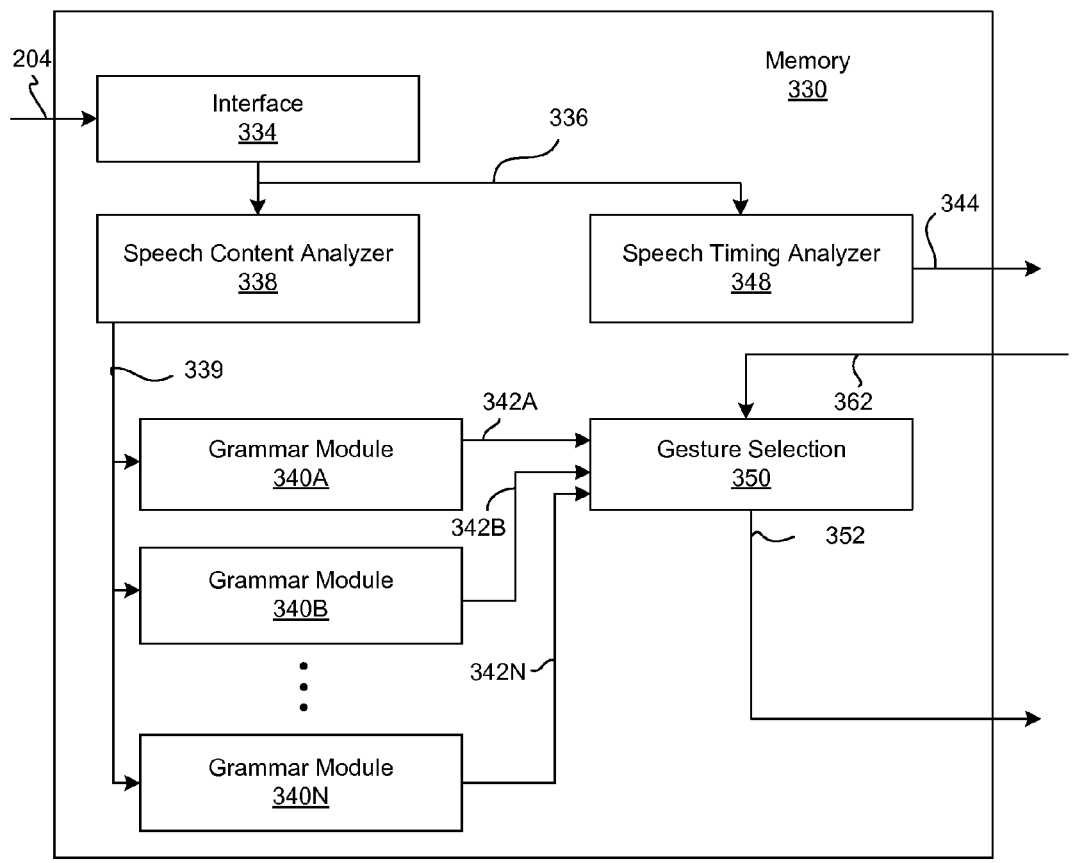
FIG. 3B is a block diagram illustrating software components of the gesture generator of FIG. 3A, according to one embodiment.

FIG. 3B is a block diagram illustrating software components of the gesture generator 210 of FIG. 3A, according to one embodiment. One or more software components illustrated in FIG. 3B may also be embodied as dedicated hardware components or firmware. The memory 330 may store, among other software components, an interface 334, a speech content analyzer 338, a plurality of grammar modules 340A through 340N (hereinafter collectively referred to as "the grammar modules 340"), a speech timing analyzer 348 and a gesture selection module 350.

The interface 334 receives the speech text 204 from an external source (e.g., the remote computer 150) and stores the speech text 204 for processing or reference by other software modules. To enable communication with the external source, the interface 334 may comply with a communication protocol.

The speech content analyzer 338 receives the buffered speech text 336 and may tag the speech text 336 with additional information. The tagged information may indicate contextual hints such as a change in the topic and the degree of excitement associated with the speech. In one or more embodiment, the speech content analyzer 338 uses Stanford Log-linear Part-Of-Speech Tagger, as described in K. Toutanova and C. Manning, "Enriching the knowledge sources used in a maximum entropy part-of-speech tagger," In Proceedings of the Workshop on Balanced Perception and Action in ECAs at AAMAS (April, 2004), which is incorporated by references herein in its entirety, to assign a word type (e.g., noun, verb, adjective) to each word in the speech text 336. In addition to identifying the word types, the speech content analyzer may tag certain words or phrases indicating an emotional or psychological state (e.g., calm, excited, neutral, happy or sad). The speech content analyzer may also detect any changes in the topic or detect emphasis in the speech text 336 (e.g., indicated by any italicized words).

The original speech text 336 with (or without) the tagged information 339 is provided to a plurality of grammar modules 340. Each grammar module is a pattern matching module that analyzes the speech text 336 and the tagged information 339 to detect certain patterns in the speech text 336. Based on the detected patterns, applicability of a certain type or category of gestures can be determined. In one embodiment, five grammar modules 340 are provided in the memory, each identifying and activating the following types or categories of gestures: (i) emblems, (ii) iconic, (iii) metaphorics, (iv) deictics, and (v) beats. For a sequence of words or sentences, one or more of these types of gestures may become active or applicable during the course of the word sequence, as described below in detail with reference to FIG. 4. When categories or types of gestures become active or applicable, each of the corresponding grammar modules 340 generates gesture identifiers 342A through 342N (hereinafter collectively referred to as "the identifiers 342"). Alternatively, the gesture identifiers 342 are streamed from the grammar modules 340 to the gesture selection module 350 regardless of the activation or applicability of the types of gesture but flagged with information to indicate the activation or applicability of the types of gestures.

Specifically, each of the grammar modules 340 has a set of rule that analyzes the speech text 336 and the tagged information to determine if a certain type of gestures is applicable. Taking an example of emblems, a grammar module (e.g., 340A) dedicated to emblems analyzes if certain key words or phrases appear in the speech text 336. If such key words or phrases appear, the grammar module outputs a gesture identifier (e.g., 342A) indicating that an emblem is active and what the gestures should represent. For example, if the speech text 336 indicates "Hello" or "Bye," the grammar module (e.g., 340A) generates and outputs a gesture identifier (e.g., 342A) that an emblem is applicable or active and that the corresponding gesture should be a gesture of waving hands to a target person. Taking another example of beats, a grammar module (e.g., 340B) dedicated to beats may generate and output gesture identifiers (e.g., 342B) on a periodic basis depending on the cadences of the associated speech.

Some of the grammar modules 340 may also detect certain types of words (e.g., verbs) by using the speech content analyzer 338 and map these words to certain types of gestures (e.g., eruptive-type of gestures). Further, the grammar modules 340 may find higher level patterns such as certain types of phrases (e.g., "between . . . and . . . ", which may cause the robot to take certain gestures between the words). Different grammar modules 340 may detect different key words or phrases, and hence, generate gesture identifiers at different parts of the word sequence.

The gesture selection module 350 receives the gesture identifiers 342 from a plurality of the grammar module 340 and selects which gesture type should be expressed by the robot 100. In one embodiment, the gesture selection module 350 selects a gesture type based on expressivity parameter 362. The expressivity parameter 362 may be provided by a human or a computer algorithm. Alternatively, the expressivity parameter 362 may be set algorithmically by a computer program or based on the analysis of the speech text. The gesture selection module 350 selects the type of gesture corresponding to a certain time frame of the speech and sends the gesture identifier 352 of the selected gesture type to the motion generator 230. The selected gesture identifier 352 may change for a set of sentences, for individual sentences or for each portion of the sentence (e.g., a phrase or a word). Hence, the gesture expressed by the robot 100 may change after the robot 100 generates an output for a set of sentences, for an individual sentence or for a portion of the sentence.

The speech timing analyzer 348 also receives the speech text 336 and parses through the speech text 336 to determine the timing when each word or phrase is to be generated by the voice synthesizer 260. In one embodiment, a text-to-speech engine is used to build a table indicating the amount of time needed to speak or generate each word or phrases. The table is then referenced to estimate the timing when each speech element (e.g., word or phrase) is spoken or generated. Based on the analysis, the speech timing analyzer 348 generates and outputs timing information 344 to the motion generator 230. As described below in detail with reference to FIG. 6, the timing information 344 may be compared with the voice synthesizer output 262 to confirm the progress of speech and correct any timing discrepancy with the predicted reproduction time of the speech.

In one embodiment, the robot 100 may include other components that provide information other than the speech text 204. Such information may also be taken into account by the speech content analyzer 338 and/or the gesture selection module to provide additional information to the grammar modules 340 or to select the gesture identifiers 342.

Selection of Gesture Type

Figure 4:
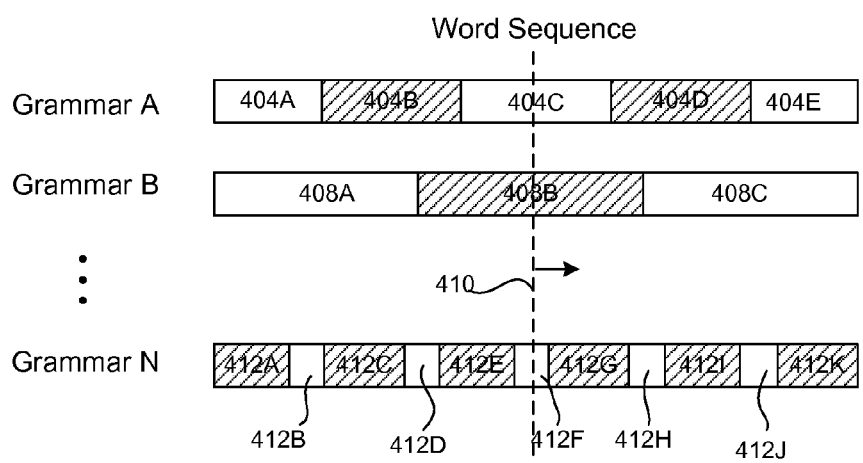
FIG. 4 is a diagram illustrating active grammar identifiers of different grammar modules, according to one embodiment.

FIG. 4 is a diagram illustrating active gesture identifiers of different grammar modules 340, according to one embodiment. As a word sequence (e.g., a sentence) is analyzed by a plurality of grammar modules, each of the grammar modules 340 may detect and generate the gesture identifiers 342 at different points of the word sequence.

As illustrated in FIG. 4, as a sliding line 410 moves from the left (i.e., starting point of the sentence) to the right (i.e., the ending point of the sentence), the gestures identifier 342 are activated at different points of the word sequence. For example, the grammar module 340A remains inactive during period 404A, 404C and 404E whereas the same module 340A generates gesture identifiers 342A during periods 404B and 404D. The grammar module 340B remains inactive during periods 408A and 408B but generates a gesture identifier 342B during period 408B. The grammar module 340N remains inactive during periods 412B, 412D, 412F, 412H and 412J but generates a gesture identifier 342B during period 412A, 412C, 412E, 412G, 412I and 412K. In the example of FIG. 4, the sliding line 410 is at a point in the word sequence where the gesture identifier 342B is active but the gesture identifiers 342A and 342N are inactive. In other words, a type of gestures detected by the gesture module 340B is active but the types of gestures detected by the gesture modules 340A and 340N are inactive.

After the gesture selection module 350 receives the active gesture identifiers 340, the gesture selection module 350 determines the gesture to be expressed by the robot 100 based on the active gesture identifiers 342 and the expressivity parameter 362. In one embodiment, different weights are assigned $w_i(x)$ to each type of gestures based on the expressivity parameter x. The expressivity parameter x indicates the strength or level of expressivity to be perceived when gestures are taken by the robot 100. No gesture has the lowest expressivity, beats have relatively low expressivity, iconic gestures have medium expressivity, metaphoric gestures have higher expressivity than the iconic gestures, deictics have higher expressivity and the emblems have the highest expressivity.

Figure 5:
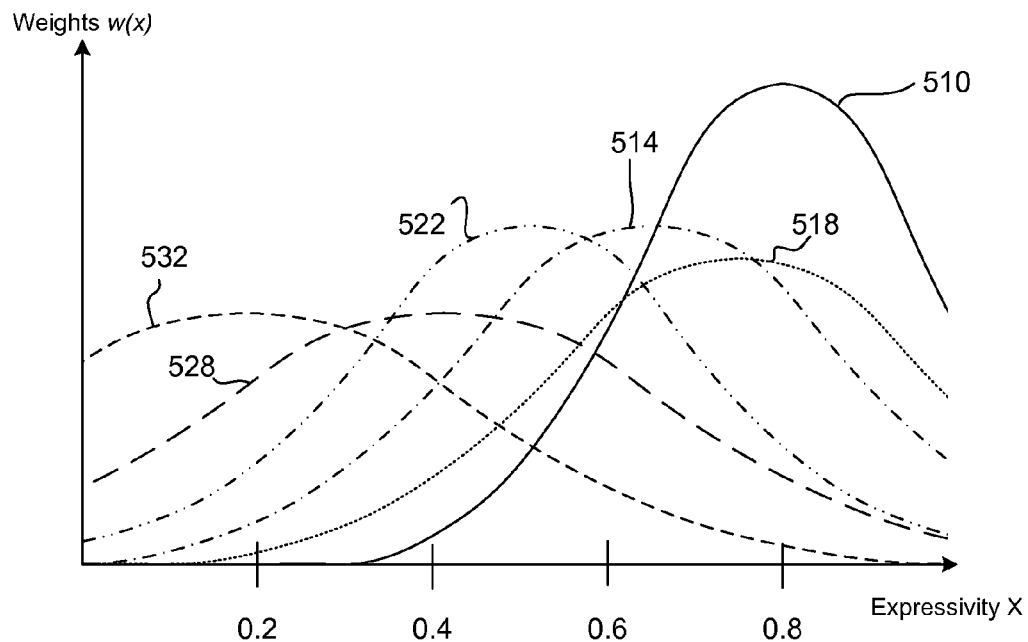
FIG. 5 is a graph illustrating weights associated with selecting a gesture to be expressed by the robot, according to one embodiment.

FIG. 5 is a graph illustrating weights $w_a(x)$ through $w_f(x)$ for different types of gestures, according to one embodiment. The distribution of weight $w_i(x)$ for each type of gestures are centered at different values of an expressivity parameter x. Given the mean value $\mu_i$ and variance $\sigma_i^2$ variance for a given gesture type i, the weight $w_i(x)$ for selecting gesture type i can be modeled as a Gaussian over the expressivity parameter x as follows:

$$w_i(x) = \frac{1}{\sigma_i \sqrt{2\pi}} e^{-(x-\mu_i)^2/(2\sigma_i^2)} \quad \text{Equation (1)}$$

where x takes a value not smaller than 0 and not larger than 1.

In FIG. 5, lines 510, 514, 518, 522, 528 and 532 represent weights $w_a(x)$ for emblems, $w_b(x)$ for iconic gestures, $w_c(x)$ for metaphoric gestures, $w_d(x)$ for deictic gestures, $w_e(x)$ for no gesture and $w_f(x)$ for beat gestures, respectively. The emblem gestures are set with a high mean and relatively low variance while iconic, metaphoric and deictic gestures have their means centered at intermediate values of x. The distribution of 'no gesture' and beats are set wide over the entire range of expressivity parameter x.

Although only six types of gestures (including 'no gesture') were used in the example of FIG. 5, more or fewer types of gestures may be used by the robot 100.

In one embodiment, the gesture type to be expressed by the robot 100 is selected probabilistically using the following equation:

$$P_i(x) = \frac{w_i(x)}{\sum_{j \in C} w_j(x)} \quad \text{Equation (2)}$$

where all active candidate gesture types for a word in the word sequence are collected in the set C. As the expressivity parameter x increases, the likelihood of selecting more expressive types of gestures increases. Conversely, as the expressivity parameter x decreases, the likelihood of selecting less expressive types of gestures increases. It is advantageous to select the gesture type probabilistically, among other reasons, because randomness can be introduced to the selection of gestures expressed by the robot 100. Due to the randomness, the robot 100 does not express the same gestures even when speaking the same text, causing the humans to perceive the gestures of the robot 100 more natural. In one embodiment, a selected gesture type is applicable to a part of a sentence such as a word or a phrase.

Based on the selected gesture type, the corresponding gesture identifier 352 is sent to the motion generator 230.

Example Motion Generator

Figure 6:
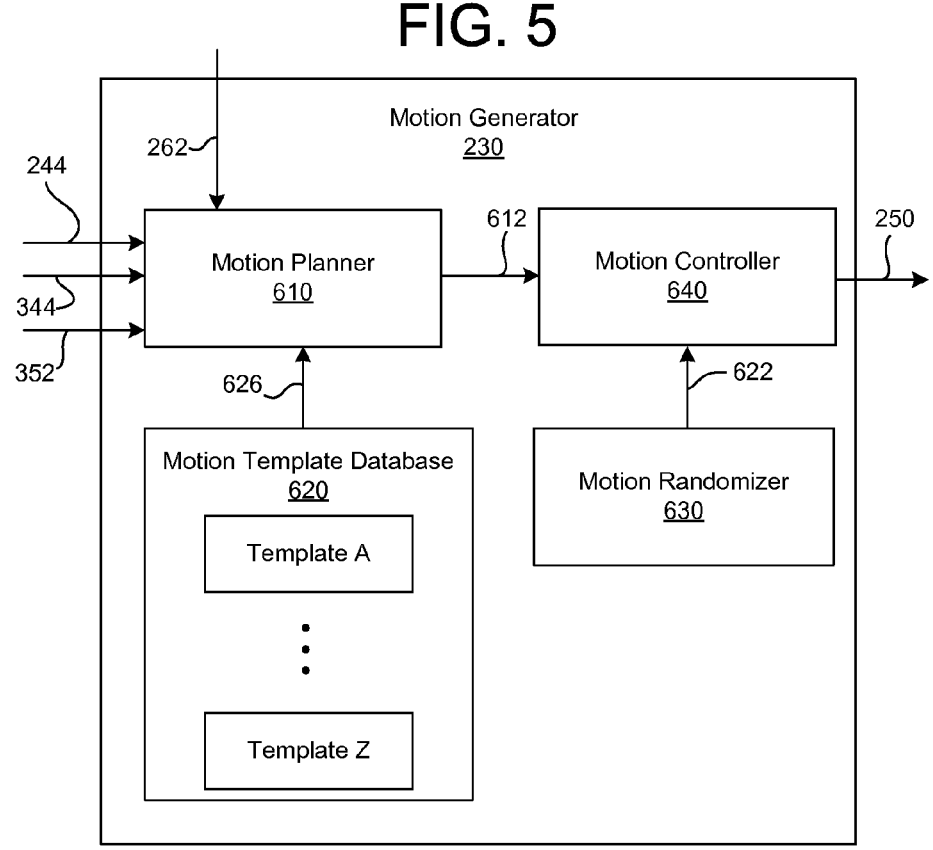
FIG. 6 is a block diagram illustrating a motion generator, according to one embodiment.

FIG. 6 is a block diagram illustrating the motion generator 230, according to one embodiment. The motion generator 230 may include, among other components, a motion planner 610, a motion template database 620, a motion randomizer 630 and a motion controller 640. These components may be embodied by the same hardware architecture as the gesture generator 210 illustrated in FIG. 3.

The motion planner 610 generates a gesture descriptor 612 indicating the gestures to be taken by the robot 100 based on the selected gesture identifier 352, the timing information 344 and the entity information 244. Specifically, the motion planner 610 retrieves a gesture template 626 corresponding to the selected gesture identifier 352 and, if needed, fills in the parameters based on the entity information 244 to generate the gesture descriptor 612.

The motion template database 620 stores a plurality of gesture templates (templates A through Z). A gesture template describes a trajectory of one or more effectors in the robot 100. Each gesture template may be associated with trajectories a different combination of effectors. Some gesture templates may describe a trajectory of a hand only whereas other gesture templates may describe trajectories of a hand and a head. A gesture template could operate to different parameters such as joint angle trajectories over time. Further, some gesture templates may need additional information or parameter to be added before the trajectory can be defined. For example, a gesture template associated with a gesture pointing to a listener may include a parameter indicating where the listener is located.

Specifically, a template stored in the motion template database 620 is mapped to a gesture identifier. After the motion planner 610 receives a selected gesture identifier 352, the motion planner 610 retrieves the gesture template 626 mapped to the gesture identifier 352 from the motion template database 620. For gesture templates that need additional information or parameter, the motion planner 610 requests and receives the entity information 244 indicating the coordinate of a human in the environment of the robot 100. The motion planner 610 extracts the coordinate of a relevant entity or other information and adds the coordinate or other information to the gesture template to generate a gesture descriptor 612.

In one embodiment, the gesture template 626 includes a set of key points that represent points to be taken by effectors. Kochanek-Bartels (TCB) cubic splines may then be used to define trajectory curves by interpolating over the set of key points. In one embodiment, tension-continuity-bias (TCB) splines are used to control how smoothly or tightly the trajectories follow the set of key points.

The motion planner 610 may modify the gesture as defined by the gesture template based on the timing information 344 to ensure that the gesture takes place in synchrony with the speech. For this purpose, the motion planner 610 may use the voice synthesizer output 262 to determine if the estimated timing of speech and the actual timing on the speech generated by the voice synthesizer 260 match. If the timing does not match, the motion planner 610 delays or advances the motions according to the gesture descriptor 612.

Furthermore, the amplitude of the trajectory of the effectors may be reduced or increased if the trajectory as defined by the gesture descriptor 612 is too large or too small to be finished in synchrony with the word or phrase being spoken. Alternatively, the trajectory may be cut short or repeated so that the time for expressing the gesture is in line with the word or phrase being spoken.

The motion planner 610 may also adds a preparatory motion before the trajectory corresponding to the finalized gesture template so that the robot 100 may make smooth transition from a previous gesture or from a starting pose. The preparatory motion may include moving the effector to a location where the initial pose of the gesture that is to take place and moving other parts of the robot 100 (e.g., moving the torso of the robot 100 to face a target human). Such preparatory motion can be taken before a corresponding word or phrase is generated by the voice synthesizer 260. The trajectory for such preparatory motion is included in the gesture descriptor 612.

The motion planner 610 also modifies the gestures as defined by the gesture descriptor 612 to retract or blend the current motion with other motions of the robot 100. For example, if a repetitive motion of reaching out an arm is to be taken repetitively, the motion planner 610 adds a retrieving motion to a neutral resting position before taking another reaching motion to make the motions of the robot 100 appear natural.

The motion controller 640 receives the gesture descriptor 612 and generates the actuator signals 250. In order to generate the actuator signals 250, the motion controller 640 receives a random number 622 from the motion randomizer 630 to afford randomness to the trajectory of the effectors. The random number 622 may cause the amplitude of the trajectory to be increased or decreased and/or change the speed of the effectors. In this way, the robot 100 does not repeat the same gestures evens when the same gesture descriptor 612 is received from the motion planner 610, rendering the gestures appear more natural to human.

In one embodiment, the trajectory of the effector is defined using style parameters that depend on the random number 622. For example, the style parameters may be defined according to the following equation:

$$S = \{A, F, T_i, C_i, B_i, t_i | i = 0 \ldots n\} \qquad \text{Equation (3)}$$

where n is the number of key frames in the current gesture description, A is amplitude of the gesture trajectory, F is the frequency of a gesture element (i.e., a unit of motion included in a gesture) that is repetitive, $T_i$ is tension, $C_i$ is continuity, $B_i$ is bias, and $t_i$ is time for keyframe i that is normalized from 0 to 1. A key frame is a sampled point on the trajectory at a given time. By describing a series of key frames, the trajectory is defined by interpolating these points to smoothly transition over different spatial points. Key frames are often used in splines to define is a smooth and continuous transition between spatial points. The tension refers to the "tightness" of the curve around the interpolated key frames in the trajectory. A high tension curve bends sharply at each key frame whereas a low tension curve bends less sharply at each key frame. In terms of a mathematical model, the tension corresponds to the length of the tangent vector at each key frame. Continuity refers to the mathematical continuity of a curve. $C_0$ means that the curves merely connect. $C_1$ means the curves connect at the point and also have the same $1^{st}$ derivative at that point (i.e., same speed). $C_2$ means the curves connect at the same point and have matching $1^{st}$ derivatives and $2^{nd}$ derivatives (i.e., acceleration). Mathematically, continuity refers to the sharpness in change between incoming and outgoing tangent vectors at each point. Bias refers to the amount of overshoot of the curve. Mathematically, the bias refers to the direction of the tangent at each point. A bias value of −1 has the tangent vector "undershooting" or more in the direction of the previous point in the trajectory while +1 has the tangent vector more in the direction of the next point in the trajectory.

The random number 622 may take different ranges of values based on the status of the robot 100 as determined by analyzing the speech text 336 or as indicated by information provided from an external source. For example, the random number 622 may take a value not smaller than 0.6 and not larger than 1 for an "excited" state, take a value not smaller than 0.3 and not larger than 0.7 for a "neutral" state, and take a value not smaller than 0 and not larger than 0.4 for a "calm" state. Further, the parameters A, F, $B_i$ and $T_i$ in equation (3) may be linear or non-linear transformations of the random number 622. More complex functions of the random number 622 and style parameters may also be used. In one embodiment, the random number 622 is generated over different ranges depending on the given style tags (e.g., calm, excited or neutral). The random number 622 is then used in functions to set values for the style parameters in Equation 3. For example, in an excited state, a very high tension value and a high bias value may be set for fast and tight arm motions whereas, in a calm state, a high value may be set for continuity to create smooth trajectories.

The motion controller 640 may also make modifications to the trajectory as defined by the gesture descriptor 612 to avoid collision between the body parts of the robot 100 in a manner well known in the art.

Example Process of Generating Gesture

Figure 7A:
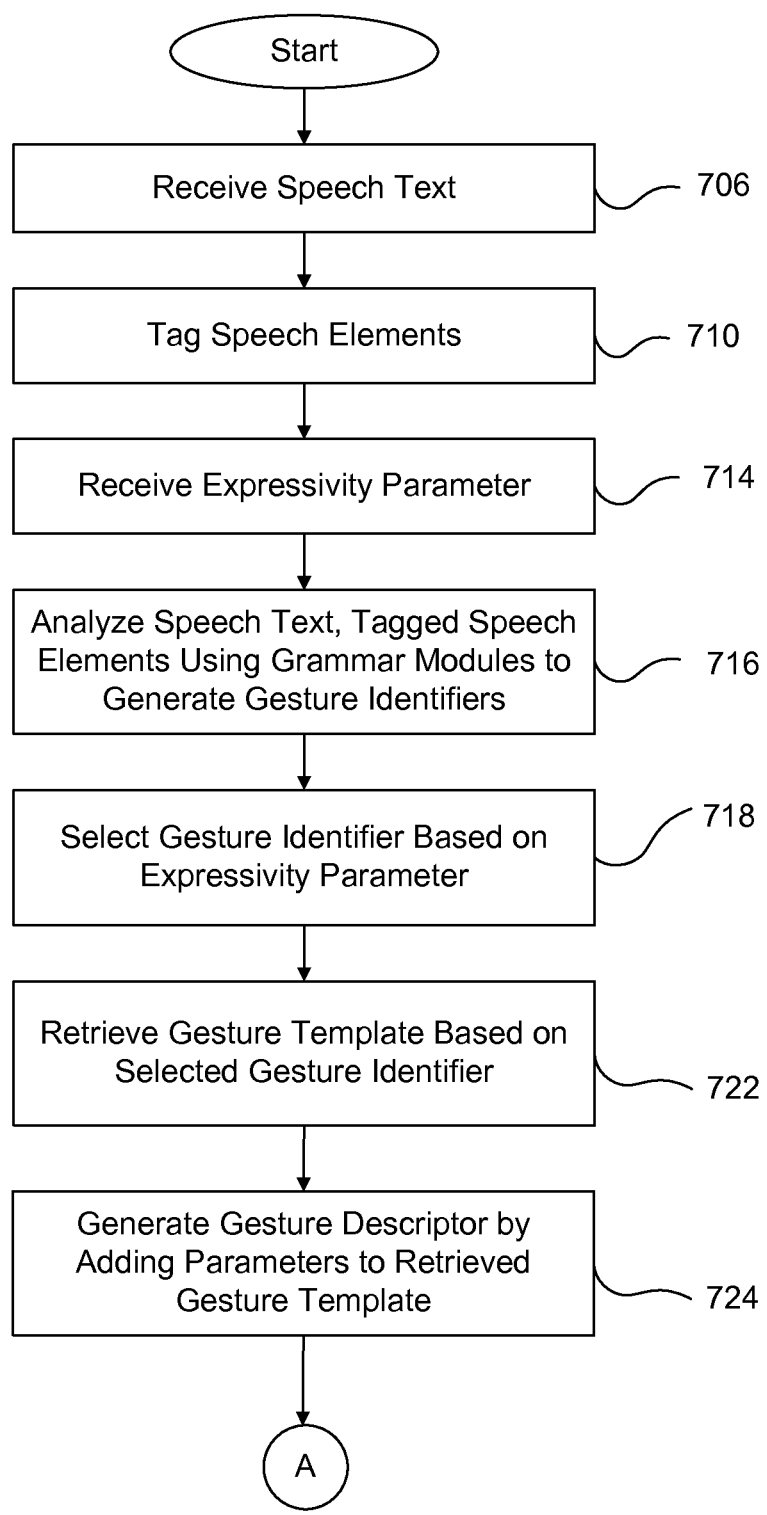
FIGS. 7A and 7B are flowcharts illustrating processes of generating a gesture, according to one embodiment.
Figure 7B:
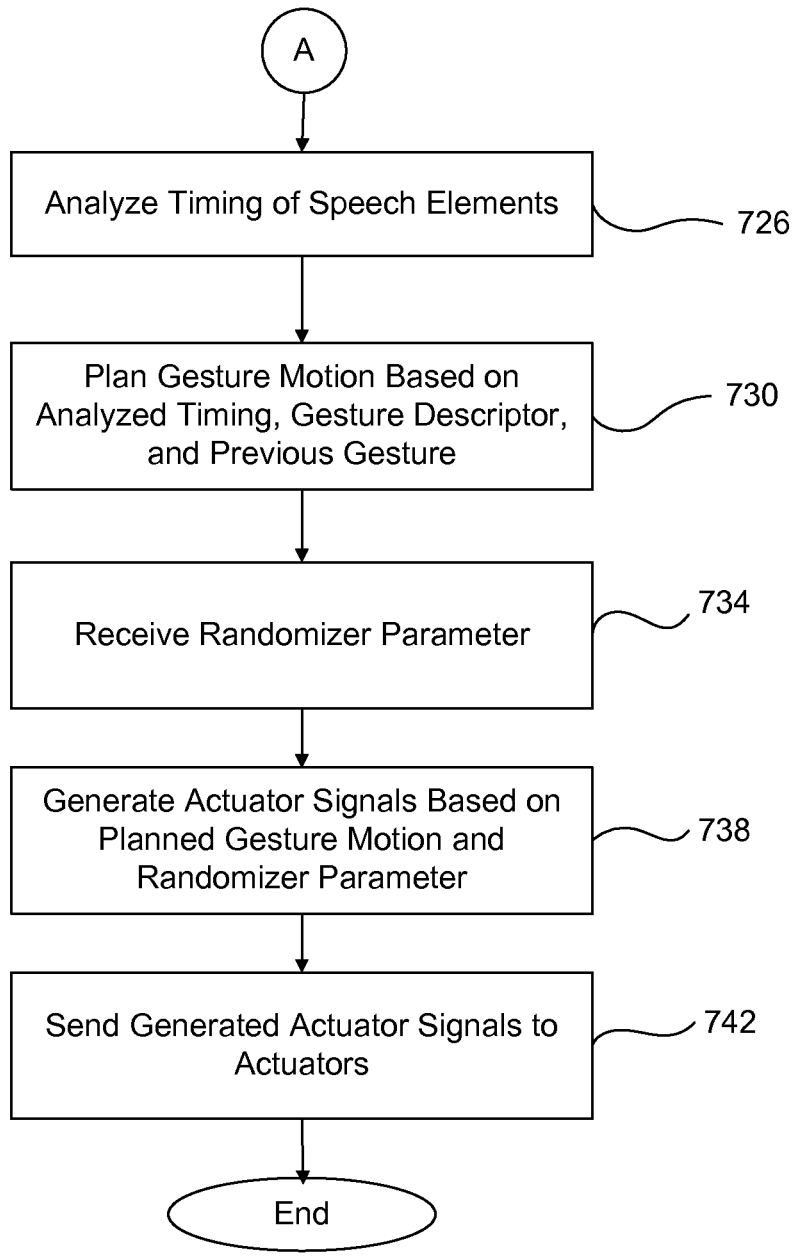

FIGS. 7A and 7B are flowcharts illustrating the processes of generating a gesture, according to one embodiment. The gesture generator 210 receives 706 a speech text. The speech text may be received from a human operator or a computer algorithm. The received text is then analyzed to tag 710 the text with additional hints or other information. The gesture generator 210 also receives 714 an expressivity parameter x.

The gesture generator 210 analyzes 716 the speech text and the tagged information using a plurality of grammar modules 340 to generate gesture identifiers 342 for each type of gestures that are determined as being active or applicable for a certain speech element (e.g., a word or phrase) of the word sequence. A single gesture identifier is generated from a single grammar module for a speech element time although the gesture identifier may change for different speech elements within the same word sequence.

The gesture generator 210 then selects 718 a gesture identifier among active gesture identifiers generated by the grammar module 340 based on the expressivity parameter x. If the expressivity parameter x is high, a gesture with higher expressivity is likely to be selected. Conversely, if the expressivity parameter x is low, a gesture with lower expressivity is likely to be selected. In one embodiment, equation (3) is used to select a gesture identifier among the active gesture identifiers.

The motion generator 230 then retrieves 722 a motion template corresponding to the selected gesture identifier. The motion generator 230 then generates 724 a gesture descriptor by adding parameters or additional information to the gesture template. The added parameters or information may indicate, for example, the coordinate of a target human.

The speech text is also analyzed 726 to determine the timing of speech elements (e.g., words or phrases) in the speech. In one embodiment, the starting times of speech elements are determined so that the timing for starting gestures corresponding to the speech elements may take place at the time the speech element is generated by the voice synthesizer 260.

The motion generator 230 plans 730 a gesture motion based on the analyzed timing of speech elements, the gesture descriptor and a previous gesture (if any). As part of the planning, the motion generator 230 also generates a preparation motion from a prior gesture motion or a starting pose to an initial position for the current gesture motion. Furthermore, as part of the planning, the motion generator 230 may modify the gesture as defined by the gesture descriptor to make motions appear more natural.

The motion generator 230 also receives 734 a randomizer parameter. The actuator signals are then generated 738 based on the planned motions and the randomizer parameter. For example, the amplitude, the speed or the frequency (for repetitive motions) may be modified based on the randomized parameter to afford randomness to the gesture. The randomized parameters may modify the style that the gesture is expressed by the robot 100. In this way, the gestures of the robot 100 would not appear as being mechanically repetitive even if the robot 100 takes the same or similar gestures. The motion generator 230 may also consider possibility of collision between the body parts when generating the actuator signals and modifies the actuator signals so that any collision between the body parts can be avoided.

The generated actuator signals are then sent 742 to the actuators to cause relative movements of the body parts.

Embodiments as described with reference to FIGS. 7A and 7B are merely illustrative. Various modifications can be made to the processes as shown in FIGS. 7A and 7B. For example, analyzing 726 timing of speech elements in parallel with other processes or occur before generating 724 the gesture descriptor. Also, one or more processes may be omitted. For example, receiving 714 expressivity parameters may be obviated and replaced with generation of a random value corresponding to the expressivity parameters.

Alternative Embodiments

In one or more embodiments, the processes of generating the gestures may be used in computer graphics or simulations as opposed to a real robot. Simulated gestures may be generated and presented to a user on a screen to facilitate generation of a video sequence including computerized virtual characters or evaluate the actual operations to be performed on a robot.

In one or more embodiments, the speech text is processed at a plurality of grammar modules in series as opposed to being processed in parallel. As the speech text is processed at each grammar module, a gesture identifier may be generated at each speech text. Each of the gesture identifiers corresponding to the same word or phrase is collected and then selected for further processing by the motion generator.

In one or more embodiments, the processing associated with the gesture generator is performed remotely at the remote computer 150, and the processing associated with the motion generation is performed locally at the local computer 140 or vice versa. Further, parts of the processes in the gesture generator or the motion generator may be performed on the remote computer 150.

Although several embodiments are described above, various modifications can be made within the scope of the present disclosure. Accordingly, the disclosure of the present invention is intended to be illustrative, but not limiting, of the scope of the invention, which is set forth in the following claims.

What is claimed is:

1. A computer-implemented method of generating a gesture in a robot, comprising:

receiving a text of a speech including one or more speech elements;

analyzing, by a processor, the speech text by a plurality of pattern modules to identify a plurality of candidate gestures associated with same speech elements in the speech, each of the plurality of pattern modules configured to apply a different set of rules to the speech elements to identify one or more corresponding candidate gestures to be made by the robot during generation of a voice output corresponding to the speech text;

selecting a gesture from the plurality of candidate gestures identified by the plurality of pattern modules;

generating the selected gesture by controlling actuators in the robot;

modifying at least one of amplitude, frequency and speed of the selected gesture based on a random number, wherein the random number is configured to take different ranges of values based on a status of the robot; and generating the voice output by synthesizing the speech text, the voice output synchronized with the gesture generated by the robot.

2. The method of claim 1, further comprising tagging information on the speech text by analyzing the speech text, wherein the plurality of candidate gestures are identified by further analyzing the tagged information.

3. The method of claim 2, wherein the tagged information indicates types of words of the speech elements.

4. The method of claim 1, further comprising planning the selected gesture by adding a preparatory motion before making a motion corresponding to the selected gesture.

5. The method of claim 4, wherein the preparatory motion moves an effector from an end position of a prior gesture or a starting gesture to an initial position of the selected gesture.

6. The method of claim 1, further comprising:
analyzing timing of the speech elements in the voice output; and
adjusting the selected gesture or the synthesized voice output to synchronize timing of the selected gesture and the timing of the speech elements in the voice output.

7. The method of claim 1, further comprising:
receiving an expressivity parameter representing a degree of expressivity to be expressed by the robot; and
selecting the gesture based further on the expressivity parameter.

8. The method of claim 1, wherein the plurality of pattern modules comprise a first pattern module configured to apply a first set of rules to detect emblems, a second pattern module configured to apply a second set of rules to detect iconics, a third pattern module configured to apply a third set of rules to detect metaphorics, a fourth pattern module configured to apply a fourth set of rules to detect deictics, and a fifth pattern module configured to apply a fifth set of rules to detect beats.

9. A robot configured to generate a gesture, comprising:
a gesture generator configured to:
receive a text of a speech including one or more speech elements;
analyze the speech text by a plurality of pattern modules to identify a plurality of candidate gestures associated with same speech elements in the speech, each of the plurality of pattern modules configured to apply a different set of rules to the speech elements to identify one or more corresponding candidate gestures to be made by the robot during generation of a voice output corresponding to the speech text; and
select a gesture from the plurality of candidate gestures identified by the plurality of pattern modules;
a motion generator configured to generate control signals based on the selected gesture and to modify at least one of amplitude, frequency and speed of the selected gesture based on a random number, wherein the random number is configured to take different ranges of values based on a status of the robot;
at least one actuator configured to cause relative movements on parts of the robot according to the control signals; and
a voice synthesizer configured to generate the voice output by synthesizing the speech text, the voice output synchronized with the gesture generated by the robot.

10. The robot of claim 9, wherein the gesture generator is further configured to tag information on the speech text by analyzing the speech text, wherein the plurality of candidate gestures are identified by further analyzing the tagged information.

11. The robot of claim 10, wherein the tagged information indicates types of words of the speech elements.

12. The robot of claim 9, wherein the motion generator is further configured to analyze timing of the speech elements in the voice output and adjust the selected gesture to synchronize timing of the selected gesture and the timing of the speech elements in the voice output.

13. The robot of claim 9, wherein the gesture generator is further configured to:
receive an expressivity parameter representing a degree of expressivity to be expressed by the robot; and
select the gesture based further on the expressivity parameter.

14. The robot of claim 9, wherein the motion generator is further configured to plan the selected gesture by adding a preparatory motion before making a motion corresponding to the selected gesture.

15. The robot of claim 9, wherein the plurality of pattern modules comprise a first pattern module configured to apply a first set of rules to detect emblems, a second pattern module configured to apply a second set of rules to detect iconics, a third pattern module configured to apply a third set of rules to detect metaphorics, a fourth pattern module configured to apply a fourth set of rules to detect deictics, and a fifth pattern module configured to apply a fifth set of rules to detect beats.

16. A non-transitory computer readable storage medium for recognizing verbal commands, the computer readable storage medium structured to store instructions, when executed, cause a processor to:
receive a text of a speech including one or more speech elements;
analyze the speech text by a plurality of pattern modules to identify a plurality of candidate gestures associated with same speech elements in the speech, each of the plurality of pattern modules configured to apply a different set of rules to the speech elements identify one or more corresponding candidate gestures to be made by a robot during generation of a voice output corresponding to the speech text;
select a gesture from the plurality of candidate gestures identified by the plurality of pattern modules;
generate the selected gesture by controlling actuators in the robot;
modify at least one of amplitude, frequency and speed of the selected gesture based on a random number, wherein the random number is configured to take different ranges of values based on a status of the robot; and generate the voice output by synthesizing the speech text, the voice output synchronized with the gesture generated by the robot.

\* \* \* \* \*